Figure 1:
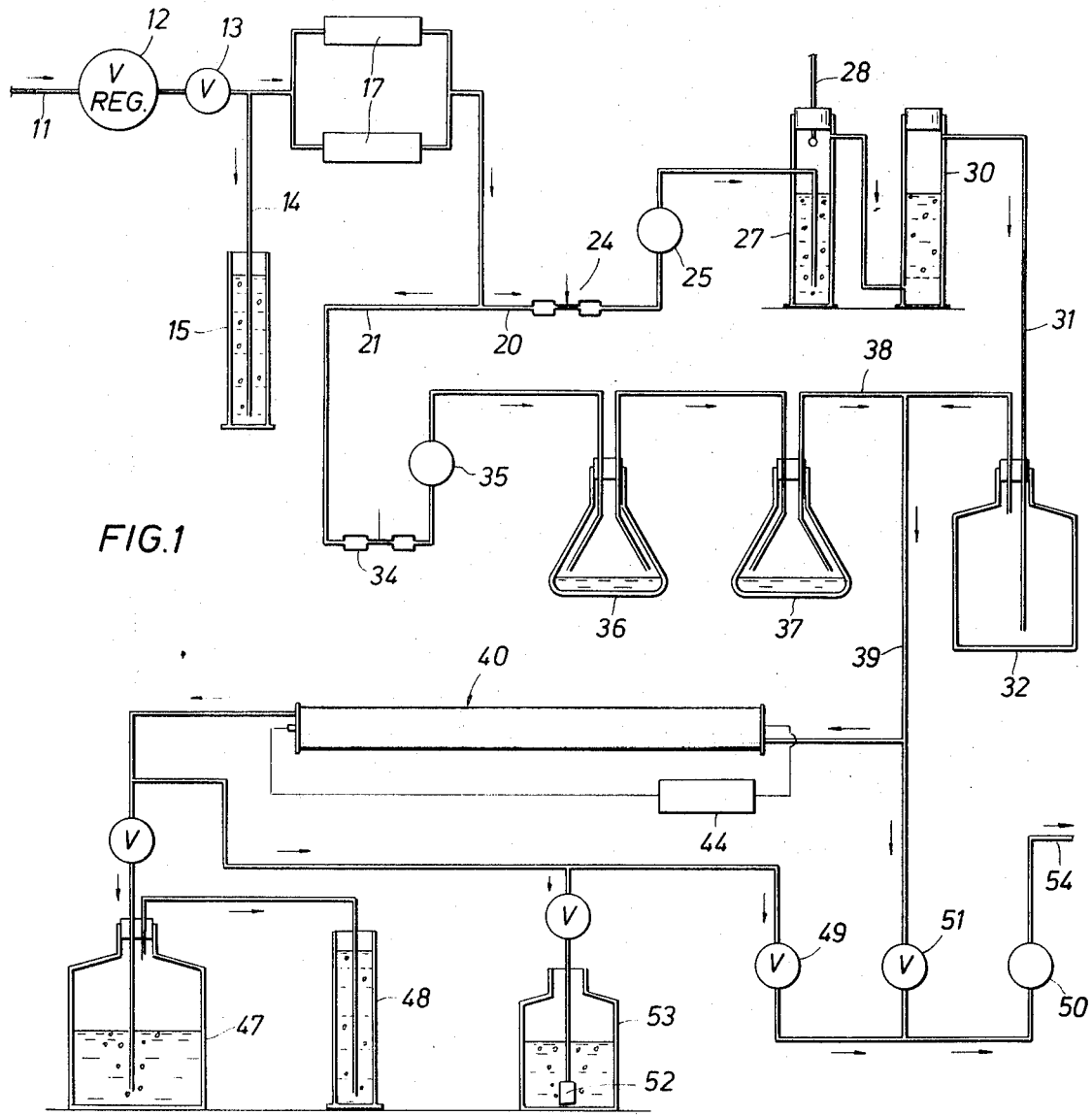

United States Patent
Scott

[15] 3,657,087
[45] Apr. 18, 1972

[54] METHOD FOR OXIDIZING A MERCAPTAN COMPOUND DISPERSED IN AIR

[72] Inventor: John W. Scott, 2020 Edson Drive, Beaumont, Tex. 77706

[22] Filed: July 24, 1969

[21] Appl. No.: 844,274

[52] U.S. Cl. .................................................. 204/158 R
[51] Int. Cl. .......................................................... B01j 1/10
[58] Field of Search .................................. 204/158 R, 193

[56] References Cited

FOREIGN PATENTS OR APPLICATIONS 1,095,916  12/1967  Great Britain ......................... 204/181

OTHER PUBLICATIONS

Ellis et al., Chemical Action of Ultraviolet Rays, page 463 (1941)

Primary Examiner—Howard S. Williams
Attorney—Paul E. Harris and Lee R. Larkin

[57] ABSTRACT

An apparatus and method for oxidizing low concentrations of mercaptan compounds in air at ambient or room temperature by using ultra-violet light, preferably from a low pressure mercury vapor lamp to supply the activation energy. The dispersion of the mercaptan compound and air is flowed through a reactor chamber and contacted with the ultra-violet light therein. Means may also be provided for contacting the dispersion with mercury vapor in the chamber to thereby increase the rate of oxidation. The resulting effluent from the method and system has a reduced concentration of noxious odor producing compounds, such that the method and system may be used in reducing air pollution, for example.

7 Claims, 6 Drawing Figures

John W. Scott
INVENTOR

BY Lee R. Larkin
ATTORNEY

John W. Scott
INVENTOR

BY *Lee K. Larkin*
ATTORNEY

METHOD FOR OXIDIZING A MERCAPTAN COMPOUND DISPERSED IN AIR

BACKGROUND OF THE INVENTION

1. Field of the Invention

This invention relates to a method and apparatus for oxidizing a mercaptan compound dispersed in air. More particularly, this invention relates to a method and system for oxidizing low concentrations of mercaptan in air (such as fumes from a chemical plant) at room or ambient temperature by using ultra-violet light to supply the activation energy. In certain instances, mercury sensitization of the reaction may be used to increase the rate of conversion of the compound.

2. Description of the Prior Art

Many prior art systems and methods have been developed for thermally oxidizing industrial waste gas which may contain only a fee parts per million of some noxious chemical, such as a mercaptan compound. One of these processes contemplates the heating of the fumes to a temperature range of 500° to 600° C., and then passing the heated fumes over a platinum-aluminum catalyst, with part of the heat subsequently being recovered. Another process contemplates the heating of these fumes to 1,200° C. by direct heat, which heat may or may not be partially recovered thereafter. In still another process, an aqueous solution of potassium permanganate is used to scrub the fumes. Generally speaking, all of the aforesaid methods and systems are relatively expensive, require the use of elevated temperatures to carry out the conversion, or are not fully satisfactory for other reasons.

SUMMARY OF THE INVENTION

It is therefore an object of this invention to provide an improved method and system for oxidizing low concentrations of mercaptan compounds in air at ambient or room temperature, which system and method eliminates the necessity for adding heat to the process, which can be carried out economically and with a simplicity of mechanical parts and assemblies.

Briefly stated, the method of this invention of oxidizing a mercaptan compound dispersed in air includes the steps of flowing the dispersion at ambient temperature through a reactor chamber. The dispersion is contacted with ultra-violet light during passage through the chamber, whereby the ultra-violet light is absorbed by the dispersion to thereby at least partially oxidize the mercaptan compound. In the preferred embodiment, the dispersion is also contacted with mercury vapor in the chamber to thereby increase the rate of oxidation. The method is preferably carried out at ambient or room temperature and the ultra-violet light is preferably supplied by a low pressure mercury vapor type lamp when mercury sensitization is employed. This invention has particular utility where the concentration of the mercaptan compound in the air is usually less than about 300 parts per million. The ultra-violet light is preferably of a wave length between about 1,700 and about 3,000 Angstrom units.

The apparatus of this invention for oxidizing a mercaptan compound dispersed in air includes a reactor defining a chamber having an inlet and an outlet. Means are provided for flowing the dispersion through the reactor at a predetermined rate of flow. At least one lamp is mounted in the chamber and arranged for producing ultra-violet light for absorption by the dispersion in the chamber. The apparatus also includes means for introducing mercury vapor into the chamber for contact with the dispersion. Baffle means may be supported in the chamber to create turbulence as the dispersion is flowed therethrough. Certain embodiments of the invention may also include a plurality of the lamps mounted at each end of the chamber and including reflecting means back of the lamp for reflecting the light along the chamber.

BRIEF DESCRIPTION OF THE DRAWINGS

FIG. 1 is a schematic layout of an experimental reactor system arranged to carry out the invention.

FIG. 2 is an isometric view partially broken away showing the reactor chamber of FIG. 1 enlarged and in greater detail.

FIG. 3 is an isometric view of a typical commercial embodiment of the apparatus of this invention.

FIG. 4 is generally a sectional view taken along line 4—4 of FIG. 3.

FIG. 5 is an inside end view of the apparatus shown in FIG. 3.

FIG. 6 is a fragmentary view taken along line 6—6 of FIG. 5 showing the lamp and the reflecting means.

DESCRIPTION OF THE INVENTION

The experimental apparatus is designed to expose a mercaptan-air mixture to ultra-violet radiation and to correlate the amount of mercaptan which is oxidized with average residence time in the reactor.

To produce a controlled concentration of mercaptan in air, a metered stream of air is passed through a mixture of n-octyl mercaptan and mineral oil as dispersed bubbles. The concentration of mercaptan in air is varied between 16 and 90 parts per million by varying the concentration of mercaptan in the mineral oil from 2 to 17 percent by weight. The stream passes through a separator to eliminate liquid droplets and enters the reactor.

In the reactor, the gas stream is exposed to ultra-violet light for periods of 5 to 15 minutes, depending on flow rate. The exit stream is absorbed in oxidizing scrubbers. When the ultra-violet light is off, the mercaptan is not affected by passage through the reactor. The concentration of the mercaptan is determined by diverting the reactor effluent through a known amount of aqueous potassium permanganate until the permanganate is decolorized. By measuring the time required for the decolorization, the concentration of mercaptan in the stream may be calculated.

With the ultra-violet light on, the time required for the decolorization is increased if the other conditions are held constant. This indicates that part of the mercaptan has been oxidized in the reactor. The extent of the oxidation in the reactor may be quantitatively estimated by comparing the decolorization times with the light off and on.

The concentration of mercaptan at a given flow rate is inversely proportional to the decolorization time.

$$C = K/t$$

where:

$C$ = Concentration of mercaptan $t$ = Decolorization time $K$ = A constant for a given flow rate and amount of permanganate.

For runs made with the light off (base runs), special symbols are used as follows:

$$C_o = K/t_o$$

where:

$C_o$ = Concentration of mercaptan in air with light off.

$t_o$ = Decolorization time with light off.

$K$ = A constant for a given flow rate and amount of permanganate.

If part of the mercaptan is destroyed by oxidation in the reactor, the time required to decolorize the permanganate will be increased.

The fraction of mercaptan oxidized in the reactor will be:

$$F = C_o - C/C_o = 1 - (t_o/t)$$

This may be an over-simplified view of the situation. It assumes that the mercaptan reacts in one step to the fully oxidized product. This almost certainly is not the case. However, if the initial disassociation of the mercaptan molecule is the rate-limiting step, the concentration of intermediates will be low and the above equation will be approximately true. In any event, the method is reproducible and was found to correlate well with the subjectively determined odor of the reactor effluent.

If it is desired to introduce mercury atoms into the reactor to sensitize the reaction, a small side stream of supply air is passed over the surface of pools of mercury in two saturators in series. This saturates the side stream with mercury vapor at approximately the vapor pressure of the mercury. The temperature of the mercury pools is varied from −78° to 0° C. to control the vapor pressure of the mercury. This side stream is mixed with the main stream containing mercaptan just before the combined stream enters the reactor. To minimize contamination of the reactor feed system, the mercury vapor is introduced as a side stream. When the system is not in operation, the side stream tubing is disconnected. It is difficult to eliminate mercury vapor from a system once the vapor has been introduced. Generally, the order of experiments has been from non-sensitized to sensitized reactions and from lower to higher concentrations of mercury vapor.

The American Conference of Governmental Industrial Hygienists has accepted a Threshold Limit Value (TLV) for mercury of 0.1 milligram per cubic meter. This value corresponds to a partial pressure of $0.85 \times 10^{-5}$ mm Hg. The Threshold Limits are defined as those limits which "represent conditions under which it is believed that nearly all workers may be repeatedly exposed, day after day, without adverse effect." The TLV imposes a practical upper limit on the mercury concentration in the effluent of any large scale reactor. For this reason, mercury saturator temperatures above 0° C. were not investigated.

The system used is shown in FIG. 1. The air supply on line 11 is taken from a compressed air system which fluctuates between 100 and 150 psig. The air passes through regulator 12 which is usually set at 15 psig on the discharge side and thence to a needle valve 13 for gross flow control. From the main stream, a branch line 14 extends downward into a 3 foot column of water 15 which allows excess air flow to escape at constant pressure. This device also protects the glass equipment downstream in the event of failure of the regulator diaphragm. The equipment in the air supply section up to the gas dispersers is connected with "Tygon" or rubber tubing.

The main air stream flows through two drying cylinders 17 of indicating "Drierite" connected in parallel. These cylinders are approximately 2⅜ inches in diameter and 10 inches long. After passage through cylinder 17, the dry air stream is divided into the main flow stream represented by lines 20 and a side stream represented by line 21 which supplies the mercury saturation system. The main stream passes through main flow control needle valve 24 which controls the flow and then into main flow rotameter 25.

The air from the main stream rotameter enters the first stage mercaptan disperser or saturator 27 which is a 350 milliliter gas washing bottle fitted with a top-entering sparger tube. The bottom of the sparger tube has four orifice openings to disperse the gas. The air temperature is measured at the exit of saturator 27 by thermometer 28. Second stage saturator 30 is a 500 milliliter gas washing bottle, but the gas enters through a bottom fritted disc.

After saturator 30, the various pieces of equipment are connected with 6 millimeter glass tubing. All plastics (except "Teflon") were avoided from this point on because it was feared that the mercaptan or its reaction products might be absorbed or desorbed by such permeable materials. The main stream passes by line 31 through a 2.5 liter glass entrainment separator vessel 32, which is used to separate small droplets of the mineral oil-mercaptan mixture from the air stream.

If mercury sensitization is used, the side stream air supply flows through flow control valve 34 and through side stream rotameter 35. The stream then passes through two 250 milliliter Erlenmeyer flasks 36 and 37 arranged as shown in FIG. 1. A pool of mercury is placed in the bottom of each flask. The inlet and outlet tubes in each flask extend down into the flask within one-fourth inch of the mercury pool. The air could not be bubbled through the mercury because some runs were made with the mercury frozen. The flasks were immersed in a methylene chloride-dry ice bath and the entire mercury saturator assembly was insulated. The side stream containing mercury joins the main stream immediately before entering reactor 40 via line 39. When the equipment is shut down, the mercury vapor entry line 38 is disconnected and the main line is plugged. This prevents uncontrolled diffusion of mercury vapor into the reactor.

Table I gives the air flow rate combinations used in the main stream and side stream rotameters and the resulting residence times in the reactor.

TABLE I.—AIR FLOW RATE AND REACTOR RESIDENCE TIME

[Flow rate units: cubic feet per hour (CFH) and liters per minute (l./min.) at 70° F. and 14.7 p.s.i.a.]

| Main Stream | | Side stream | | Total | | Residence time (min.) |
|---|---|---|---|---|---|---|
| CFH | l./min. | CFH | l./min. | CFH | l./min. | |
| 3.85 | 1.82 | 0 | 0 | 3.85 | 1.82 | 14.96 |
| 7.74 | 3.66 | 0 | 0 | 7.74 | 3.66 | 7.45 |
| 11.76 | 5.55 | 0 | 0 | 11.76 | 5.55 | 4.90 |
| 3.85 | 1.82 | .388 | .183 | 4.24 | 2.00 | 13.60 |
| 7.74 | 3.66 | .868 | .410 | 8.61 | 4.07 | 6.70 |
| 11.76 | 5.55 | 1.165 | .55 | 12.93 | 6.11 | 4.46 |

Figure 2:
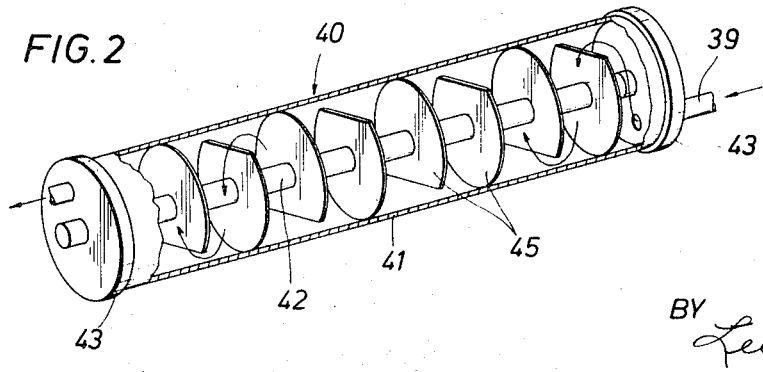
Figure 3:
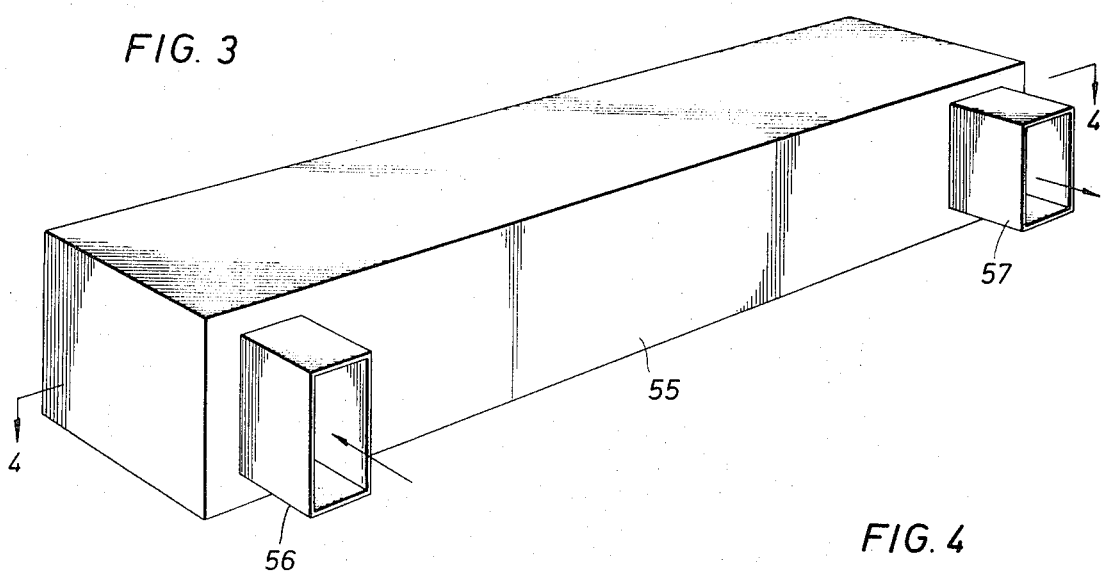
Figure 4:
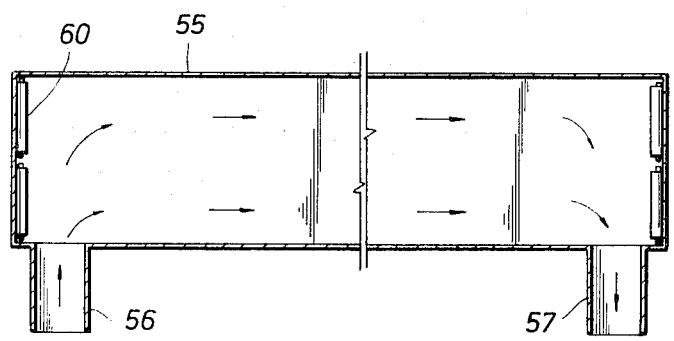
Figure 5:
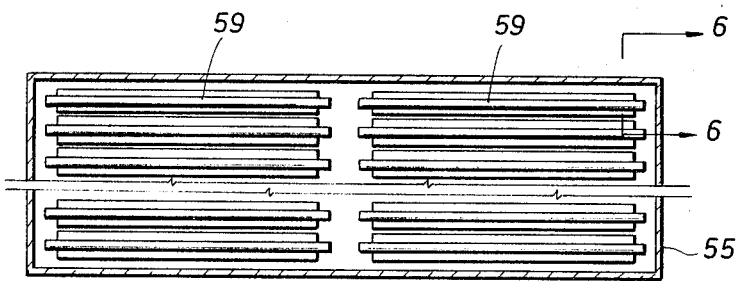
Figure 6:
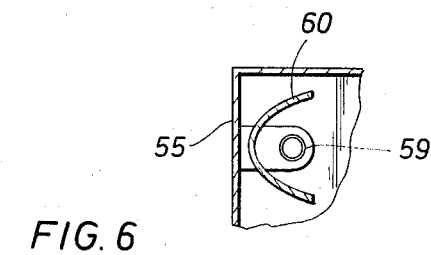

Reactor 40 is shown in greater detail in FIG. 2. The shell 41 of reactor 40 consists of a 5 foot long, 6 inch diameter "Pyrex" pipe section with both ends flanged. A low pressure mercury arc lamp 42 runs the full length of shell 41. The ends of shell 41 are closed with blank flanges 43 made from ¾ inch plywood. The inside surfaces of flanges 43 are lined with 1/16 inch thick sheet "Teflon." Baffles 45 with alternate side openings are mounted inside shell 41 to create turbulence and promote mixing of the gas stream in reactor 40 and insure a reasonably narrow distribution of residence times. At maximum flow rate, the Reynolds number for the unbaffled reactor 40 is fifty. If flow through reactor 40 is turbulent, the baffles may be unnecessary. The cross-sectional area of the reactor is 28.25 inches. The open segment cut from baffles 45 is 3.09 inches or approximately 11 percent of the cross-section. The total volume of the reactor is 0.9815 cubic feet. Deducting the volume of the lamp and baffles gives a net volume of 0.9610 cubic feet or 27.21 liters for free volume of the reactor.

Mercury vapor lamp 42 was manufactured by the General Electric Company as a germicidal lamp, Model No. G64T6. This lamp is basically the same as a common fluorescent lamp except that no fluorescing material is applied to the inside of the tube. A second special feature of the lamp is the type of glass used in the envelope. This glass is capable of transmitting 74 percent of the 2,537 A light generated in the lamp. The nominal input of electrical energy is 65 watts and the output radiant energy at 2,537 A is 18.0 watts. The spectral energy at 1,849 A is probably absorbed in the glass envelope, and the amount finally emitted by the lamp is so small that the manufacturer is unable to measure it. This is an important consideration because the 1,849 A line is the only spectral line of mercury capable of producing ozone in a non-sensitized reaction. When this line is effectively filtered out, the absence of ozone may be inferred in non-sensitized reactions.

The intensity of the ultra-violet light is inversely proportional to the radial distance from the axis of the tube and may be calculated by the following formula, assuming there is no absorption:

$$I = 6.8/r$$

where:
$I$ = Intensity in watts/sq. ft.
$r$ = Radial distance from tube axis in inches.

This formula is based on data given by the manufacturer. Using this formula, the light intensity is calculated to be 18.14 watts/sq. ft. at the surface of the lamp which has a radius of 0.375 inches. At the wall of the reactor, ($r = 3.0$ inches), the intensity is 2.26 watts/sq. ft.

To accommodate the 64 inch length of lamp 42, it is allowed to protrude through the blank flange 43 at the exit end of reactor 40. This feature also permits the effective length of reactor 40 to be reduced by pulling the lamp 42 out of the reactor. The points at which the inlet and exit tube and the wire and lamp tube pass through flanges 43 are sealed with silicone cement.

The vapor leaving reactor 40 is normally bubbled through a strong alkaline solution of potassium dichromate in flask 47 to oxidize most of the compounds leaving reactor 40. Any residual odor is removed by bubbling the vapor through ¼ inch glass raschig rings and potassium permanganate solution in cylinder 48.

To determine the odor of the exit or effluent gas, a valve 49 is opened to permit a small flow through rotameter 50. The odor is detected at the end of the exit tube 54. For comparison, a similar sample of the inlet gas may be taken through a second control valve 51.

Reactor conversion is measured by decolorization as described previously. During a run, the reactor exit gas is passed through a gas dispersion tube with a fritted glass cylinder 52 on the end. Cylinder 52 is immersed in the potassium permanganate solution contained in flask 53.

Operation of this equipment is as follows. After the saturators and scrubber containers have been filled, the system is ready for operation. The flow of air is established by setting the air regulator 12 at 15 psig. Main rotameter valve 24 is fully opened. Throttle valve 13 on the exit of regulator 12 is adjusted to give a flow through rotameter 25 slightly in excess of the flow desired. Then the main rotameter valve 24 is throttled to give exactly the flow desired through main rotameter 25. The excess flow escapes through water column 15 which establishes a very uniform supply pressure to rotameter 25.

After the concentration of mercaptan in mineral oil is changed, runs are made with lamp 42 off. These runs are called base runs because they establish the basis for comparison with runs with lamp 42 on.

It was found that a certain minimum time was needed to reestablish equilibrium after a change in flow rate or after turning lamp 42 off or on. In most cases, this time was equal to roughly three times the average residence time in the reactor. For example, at the maximum flow rate of 0.196 cubic feet/minute, the average residence time is 4.9 minutes and approximately 15 minutes is required to approach equilibrium. By a similar estimation, 45 minutes is required to attain equilibrium at the lowest flow rate of 0.0641 cubic feet/minute.

After reactor conditions have been maintained long enough to achieve equilibrium, a series of runs are made under the same conditions until several consistent results indicate the reactor effluent has reached equilibrium. Each run consists of a reaction of the reactor exit stream with an aliquot of potassium permanganate. In this case, the variable is the time required by the reactor effluent to decolorize the aliquot of permanganate.

Alkaline methanol-water mixtures have been shown to be effective in dissolving alkyl mercaptans. For this reason, the analysis medium includes methyl alcohol to solubilize the organic products of reaction. Potassium permanganate is effective as an oxidizer under somewhat alkaline conditions and the pH of this medium is 10.8.

The medium used for each analysis consists of one hundred milliliters of a stock solution of the following composition:

| | Weight % |
|---|---|
| Reagent Grade Methanol | 41.7 |
| Distilled Water | 58.0 |
| NaHCO$_3$ | 0.13 |
| Na$_2$CO$_3$ | 0.13 |

To this medium is added 1 milliliter of a stock solution of potassium permanganate in distilled water just before titration.

When the analysis mixture is ready, the exit stream from reactor 40 is diverted to be fritted disc gas disperser cylinder 52. The disperser cylinder 52 is put into the permanganate solution and simultaneously an electric timer is started. Main flow rotameter 25 is adjusted to compensate for any change in back pressure. When the last trace of orange color disappears, the solution is a clear pale yellow color. The timer is stopped when this end point is reached and the run data is recorded. The color change is difficult to see unless the lighting is good and a white background is provided. It is necessary to provide a reference color by titrating a preliminary sample past the end point. The reactor exit gas is diverted to the absorbers in the form of flask 47 and cylinder 48, again until the next run is made.

When mercury sensitization is to be employed, the cold bath around the mercury saturator flasks 36 and 37 is first adjusted to the desired temperature using a methylene chloride-dry ice bath. The air flow through mercury saturator flasks 36 and 37 is then started and the main stream flow is operated as before. The side stream flow is maintained at 10 percent of the main stream flow to maintain a constant mercury vapor level.

The amount of mercury carried into reactor 40 from the saturators was too small to be determined by ordinary means during actual reactor runs. For example, at $-40°$ C., the weight of mercury carried into the reactor is about $3 \times 10^{-7}$ grams/hour. At the temperature of dry ice ($-78°$ C.), the weight loss of mercury is approximately $1 \times 10^{-10}$ grams/hour, assuming the air stream is saturated with mercury vapor.

From weight loss experiments carried out at room temperature, it was found that the air stream was 90 percent saturated with mercury vapor. From this it is assumed that roughly 90 of saturation is attained at the lower temperatures actually used for reactor sensitization.

The side stream flow is maintained at 9 to 10 percent of the combined side stream and main stream flow. Thus the concentration of mercury in reactor 40 will be one-tenth of the vapor pressure in the mercury saturator.

It is necessary to correct each run time (the time necessary to decolorize the aliquot of permanganate) for small temperature variations in the saturator which affect the mercaptan partial pressure. The corrected run time is then compared with the comparable base run time (light off) to calculate the percent of the mercaptan oxidized.

Original data Table II includes selected runs and shows the temperature-corrected run time, the base run time, and the calculated conversion. Table III shows data for selected mercury sensitized runs, wherein the mercury saturator temperature is also listed.

TABLE II

ORIGINAL AND CORRECTED DATA TO CALCULATE CONVERSIONS FOR SELECTED RUNS 46 TO 69

Run Time: The time required to decolorize $1.51 \times 10^{-5}$ g. moles of KMnO$_4$.

Mercaptan concentration in saturators: 17.14 percent.

| Run No. | Flow Rate l./min. | Base Temp. (°F.) | Run Time (min.) | Corrected Run Time (min.) | Conversion (%) |
|---|---|---|---|---|---|
| 46 | 3.66 | 71 | 0.284 | 0.645 | 56.0 |
| 47 | 3.66 | 71 | 0.284 | 0.621 | 54.3 |
| 51 | 1.82 | 71 | 0.496 | 4.27 | 88.4 |
| 52 | 1.82 | 71 | 0.496 | 4.23 | 88.2 |
| 53 | 1.82 | 71 | 0.496 | 4.17 | 88.1 |
| 54 | 1.82 | 71 | 0.496 | 4.01 | 87.6 |
| 55 | 1.82 | 71 | 0.496 | 4.14 | 88.0 |
| 56 | 1.82 | 71 | 0.496 | 4.19 | 88.1 |
| 57 | 1.82 | 71 | 0.496 | 4.14 | 88.0 |
| 68 | 5.55 | 69 | 0.225 | 0.43 | 47.7 |
| 69 | 5.55 | 69 | 0.225 | 0.39 | 42.3 |

TABLE III

ORIGINAL AND CORRECTED DATA TO CALCULATE CONVERSIONS FOR SELECTED RUNS

Run Time: The time required to decolorize $1.60 \times 10^{-5}$ g. moles of $KMnO_4$.
Mercaptan concentration in saturators: 2.09 percent.

| Run nos. | Flow rate l./min. | Base runs Temp. (°F.) | Base runs Time (sec.) | Corrected run time (sec.) | Hg. temp. (°C.) | Conversion (percent) |
|---|---|---|---|---|---|---|
| 182 | 4.07 | 70 | 89.0 | 751 | −0.5 | 88.2 |
| 184 | 4.07 | 70 | 89.0 | 656 | −0.5 | 86.4 |
| 185 | 4.07 | 70 | 89.0 | 691 | −0.5 | 87.1 |
| 186 | 6.10 | 70 | 59.7 | 262 | +0.5 | 77.2 |
| 187 | 6.10 | 70 | 59.7 | 271 | +0.5 | 78.0 |
| 188 | 6.10 | 70 | 59.7 | 266 | +0.5 | 77.6 |
| 189 | 6.10 | 70 | 59.7 | 262 | +0.5 | 77.2 |
| 190 | 4.07 | 70 | 89.0 | 517 | +0.5 | 82.8 |
| 191 | 4.07 | 70 | 89.0 | 525 | +0.7 | 83.0 |
| 192 | 4.07 | 70 | 89.0 | 535 | +0.7 | 83.4 |
| 193 | 2.00 | 70 | 172.0 | 1,025 | +1.5 | 83.2 |
| 194 | 2.00 | 70 | 172.0 | 996 | +1.5 | 82.7 |
| 195 | 2.00 | 70 | 172.0 | 969 | +2.5 | 82.2 |

The increased absorption of light afforded by sensitization with mercury vapor substantially increases the reaction rate. The reaction rate is so high with mercury sensitization that the reaction was practically over at the minimum 4.9 minute residence time. Runs 182 – 195 were made with a mercury vapor pressure of roughly $1.6 \times 10^{-5}$ mm Hg., the highest partial pressure used.

In the series of runs made at a flow rate of 6.10 l./min. (4.46 min. residence time) it was found that the conversion of mercaptan increases almost linearly with the logarithm of the mercury vapor pressure in the region of $10^8$ to $1.6 \times 10^{-5}$ mm and the conversion reaches 80 percent at the highest mercury pressure. This compares with a 43 to 50 percent conversion at the same residence time for the non-sensitized reaction. It is also found that the conversion went down only slightly when the mercury saturators were subsequently cooled down to dry ice temperature. Runs made at the longer residence time of 6.76 minutes gave higher conversions, with the highest being 87 percent. The residence time is proportional to the radiant energy absorbed by the gas. The light intensity in reactor 40 varies with the radius. It is presently thought that the quantum yield is near unity, assuming that the absorbance is the same as that published for methyl mercaptan.

The odor of the effluent gas shows a definite correlation with conversion. At 47 percent conversion, the mercaptan odor was observed to be moderate to strong. At 57 to 60 percent conversion, the odor was moderate except at the lowest concentration level (18 ppm), where the odor was sweetish. At higher conversions, above 70 percent, the odors were sweetish, weak or slight. The odor at higher conversion was different in character from mercaptan, and resembles the odor of partially oxidized oil. Because smell is a highly subjective sense, an impartial observer was asked to characterize the odor at high conversion. This observer independently judged the odor to be "like hot or burned oil." It was also noted that there was substantially no $SO_2$ produced, particularly at the higher conversion rate.

Applicant's Thesis presented to the faculty of the Graduate School, Lamar State College of Technology, Beaumont, Texas, in partial fulfillment of the requirements for the degree of Master of Engineering Science in August, 1968, and entitled "An Experimental Study of the Oxidation of N-octyl Mercaptan in Air Using Ultra-Violet Light" provides additional details of the experimental procedures and the results obtained.

Referring now to FIGS. 3 – 6, a typical commercial embodiment will be described. In this embodiment, the reactor is in the form of elongated housing 55, which is generally square in cross-section and which is provided with an inlet 56 and an outlet 57 by which the fumes to be treated are flowed through the reactor in the direction shown by the arrows. The external dimensions of housing 55 might be on the order of 15 feet square and 130 feet long for example, depending upon the concentration level of the mercaptan compound in the air, the residence time or rate of flow through the reactor, the intensity and type of light source used, and depending upon whether mercury sensitization is used. The interior of housing 55 would preferably be of polished Alzak aluminum, having good reflecting properties. Each end of housing 55 has mounted on the inside thereof two vertically extending rows of ultra-violet lamps 59, each of which has a parabolic reflector 60 supported therebehind and facing toward the opposite end, to gain the maximum light path length.

In the embodiment shown, there would preferably be a total of 128 lamps, or thereabout, of the type previously described. If mercury sensitization is used, the size of the reactor housing 55 may be reduced. The use of a wave length near 2,000 A would probably increase the molar absorptivity and shorten the required length of the reactor chamber. The use of high intensity light sources would increase the light intensity and lead to a reduction in the required cross-section of the housing. Light with wave length of up to about 3,000 A could be used and still have enough energy to break the sulfhydryl bonds. However, with shorter wave lengths, there would be more than enough energy. The length of the wave lengths would depend to some extend upon the absorption characteristics of the gas which is to be oxidized. Only if it is desirable to use mercury sensitization is it especially necessary to use low pressure mercury vapor light. It is known that shorter wave lengths, for example 2,000 A, are more strongly absorbed by methyl mercaptan than is mercury vapor light. A wave length of 2,537 A is convenient and desirable for experimental work, and it marks an energy level in the electromagnetic spectrum somewhat above the bond energies of all of the bonds in aliphatic mercaptans.

For methyl mercaptan, the ideal wave length is thought to be about 2,000 A where the molecular absorptivity is about 1,750. At the wave length used in the experimental work, i.e. 2,537 A, the molecular absorptivity was only about 50. $CO_2$ and $O_2$ do not interfere above about 1,700 A.

For a commercial large linear reactor where a large fraction of the light is to be absorbed, the production rate will be equal to the light energy released in the reactor times the fraction of the light absorbed by the reacting species. The efficiency of the reactor is dependent upon the fraction of the light absorbed. The length of a reactor will be chosen to give an economical balance between reactor length and power consumption. The length of the reactor can be shortened in a number of ways, such as: (a) By choosing a wave length where the molecular activity is higher; (b) By reflecting light from the back end of the reactor so that the effective length of the reactor is doubled, as shown in FIGS. 3 – 6; (c) By sensitizing the reaction with a compound such as mercury vapor, as discussed in the experimental model.

To use mercury sensitization, it is presently thought that the lamps must be of the low pressure type resonance mercury light. One disadvantage of this is that these lamps are very low intensity and the reactor must have a large cross-section to get the required energy input in the lamps spaced in the end of the reactor.

It will thus be observed that this invention teaches a method and system whereby a low concentration of n-octyl-mercaptan compounds in air may be oxidized at room temperature using ultra-violet light. It has also been shown that mercury sensitization is effective for increasing the conversion rate. It is believed that this method and system of photochemical activation is substantially more economical than chemical, thermal or catalytic methods in reducing the odor of a mercaptan-air stream. This is contrary to the general opinion that photochemical reactions are only economical when a chain reaction is initiated.

Further, if a mercaptan-containing air stream is thermally oxidized, the effluent will contain sulphur dioxide which is, itself, a carefully controlled air contaminant. By contrast, no sulphur dioxide odor was ever detected in the photochemically oxidized mercaptan effluent from this invention. This suggests that the sulphur dioxide may react with hydrocarbon radicals to form an inoffensive compound. It is also presently believed that the process of this invention enjoys a substantial economic advantage over other methods at low concentration levels. As the concentration is increased the economic advantages may be somewhat less.

It is to be understood that the foregoing description is to be construed as illustrative only. Further modification and alternate embodiments will be evident to those skilled in the art in view of this description.

What is claimed is:

1. In a method of oxidizing a gaseous mercaptan compound dispersed in air in, the combination of steps comprising:
   flowing said gaseous dispersion through a reactor chamber having inlet and outlet means;
   and, contacting said gaseous dispersion with ultraviolet light having a wave length between 1,700 and about 3,000 angstroms during passage through said chamber, to thereby at least partially oxidize said mercaptan compound.

2. The invention as claimed in claim 1 wherein:
   said contacting step is carried out at room temperature.

3. The invention as claimed in claim 1 including:
   reflecting light generally along the line of travel of said dispersion through said chamber.

4. In a method of oxidizing a mercaptan compound dispersed in air, the combination of steps comprising:
   flowing said dispersion through a reaction chamber;
   contacting said dispersion with ultraviolet light from a low pressure mercury vapor type lamp during passage through said chamber, to thereby at least partially oxidize said mercaptan compound;
   and, contacting said dispersion with mercury vapor in said chamber, to thereby increase the rates of oxidation.

5. The invention as claimed in claim 4 wherein:
   said contacting step is carried out at room temperature.

6. The invention as claimed in claim 4 including:
   reflecting said light generally along the line of travel of said dispersion through said chamber.

7. In a method of controlling air pollution to a commercially significant degree by oxidizing a low concentration of a gaseous mercaptan compound dispersed in air, the combination of steps comprising:
   flowing said dispersion of mercaptan compound in air through a reactor chamber at room temperature, with the concentration of said mercaptan compound being less than about 300 parts per million;
   contacting said dispersion with ultraviolet light during passage through said chamber, with the wave length of said light being between about 1,700 and 3,000 angstrom units;
   and, contacting said dispersion with mercury vapor in said chamber;
   whereby said mercaptan compound is at least partially oxidized to produce an effluent with a substantially reduced noxious odor.

* * * * *